United States Patent [19]

Smith

[11] Patent Number: 5,071,176

[45] Date of Patent: Dec. 10, 1991

[54] KENNEL LATCH

[75] Inventor: E. W. Smith, Burleson, Tex.

[73] Assignee: Doskocil Manufacturing Company, Inc., Arlington, Tex.

[21] Appl. No.: 672,170

[22] Filed: Mar. 19, 1991

[51] Int. Cl.$^5$ ............................................. E05C 9/04
[52] U.S. Cl. ........................................ 292/7; 292/42
[58] Field of Search ................ 292/7, 6, 42, DIG. 30, 292/63, 67

[56] References Cited

U.S. PATENT DOCUMENTS

| | | | |
|---|---|---|---|
| 593,615 | 11/1897 | Sheer | 292/7 |
| 712,992 | 11/1902 | Bird | 292/7 |
| 729,052 | 5/1903 | Finberg . | |
| 1,161,927 | 11/1915 | Crosby . | |
| 1,922,062 | 8/1933 | Sullivan | 292/7 |
| 2,063,213 | 12/1936 | Wirz . | |
| 2,238,379 | 4/1941 | Tiffany . | |
| 2,272,145 | 2/1942 | Anderson et al. . | |
| 2,319,982 | 5/1943 | Fralinger . | |
| 2,452,521 | 10/1948 | Johnson et al. | 292/7 |
| 2,875,918 | 3/1959 | Baumier . | |
| 3,504,618 | 4/1970 | Rosner | 292/7 |
| 3,521,919 | 7/1970 | Berg | 292/7 |
| 3,620,559 | 11/1971 | Jones | 292/DIG. 30 |
| 3,788,678 | 1/1974 | Switzgable | 292/7 |
| 3,907,150 | 9/1975 | Jurasek | 292/DIG. 30 |
| 4,639,021 | 1/1987 | Hope . | |
| 4,728,131 | 3/1988 | Burns | 292/7 |
| 4,930,819 | 6/1990 | Sharp et al. | 292/42 |

FOREIGN PATENT DOCUMENTS 256064 8/1926 United Kingdom .................. 292/7

Primary Examiner—Eric K. Nicholson
Attorney, Agent, or Firm—Duke W. Yee

[57] ABSTRACT

A latch system is provided having utility in securing a door or planar member in a fixed position within a housing having a portal. The portal includes a defined periphery with a plurality of apertures therein. The planar member is pivotally mounted adjacent the portal. A rotatable member is mounted adjacent to the planar member. The latch system also includes a plurality of elongate members, each of the elongate members having a first end adapted to slidably enter an associated aperture and a second end pivotally mounted to the rotatable member, wherein rotation of the rotatable member will cause both angular and axial movement of the elongate members. Rotation of the rotatable member in one direction causes the first ends of the elongate member to engage associated apertures securing the planar member in a closed position. Rotation in the opposite direction causes the first ends to disengage from associated apertures permitting the planar member to pivot, allowing the planar member to be moved into an open position. Guide members are provided for assisting and guiding movement of the plurality of elongate members into and out of the apertures. In accordance with an important feature of the present invention, a latch element is provided intermediate the rotatable member and at least one associated guide member, wherein the latch element may be utilized to selectively restrict angular movement of at least one member of the plurality of elongate members.

10 Claims, 3 Drawing Sheets

KENNEL LATCH

BACKGROUND OF THE INVENTION

1. Field of the Invention

The present invention relates in general to an improved latch system for securing a door in a closed position and in particular to a latch system to secure a rotatable member and multiple elongate members pivotally connected to the rotatable member in an engaged position, securing the door in a closed position. Still more particularly, the present invention provides an improved latch system which secures a door in a closed position by preventing angular movement of one or more elongate members pivotally connected to the rotatable member in an engaged position.

2. Description of the Prior Art

A long standing practice exists for housing animals in kennels. In particular, portable kennels have been used to transport animals over various distances. For example, portable kennels are used to secure animals for transportation from one location to another on commercial carriers, such as airplanes, ships, and buses. Furthermore, these kennels are used to transport animals over shorter distances such as from a home to a veterinary clinic. The portable kennels may also be used for securing an animal indoors for a short period of time.

Portable kennels generally comprise a housing unit, a door, and a means for securing the door in a closed position, such as a latch or a lock. The prior art discloses various systems for securing a door or a cover in a closed position.

For example, U.S. Pat. No. 3,504,618 discloses an air duct register with an anchoring device which includes a rotatable disk with rod-like detents connected to the disc adjacent the rim by a pivot pin. To retain the register anchoring mechanism stably in both its retracted and its fully or partially advanced positions, a leaf spring or finger is mounted in a bracket fixed to a portion of a U-shaped member. The outer free end of the finger is selectively received within one of a plurality of radially extending slots in the edge of the disc.

U.S. Pat. No. 4,639,021 discloses a notched crank having a gear with teeth and having bolt rods pivotally connected to the crank by means of pin and clevis connection. A stop means comprising a post mounted on a stile and positoned to contact abutment shoulder of the notched crank plate in the retracted position of the rods and abutment shoulder of a notched crank plate in the extended position of the rods. In addition, a latch means is provided for maintaining the spring biased bolt rods releasably in their door locking position. The latch means comprises a ratchet with gear teeth that mesh with teeth on the gear associated with the notched crank. The ratchet also contains teeth cooperating with a pawl, preferably of spring steel, and preferably mounted on a stop. The pawl and ratchet teeth are operatable to maintain the spring-biased bolt rods releasably in a door-locking position. The button-actuated, spring-pressed, concentric shaft structure described above provides a trip which is operated to disengage the gears when the bolt rods are in their spring-biased, door-locking position. When such disengagement occurs, the biasing springs associated with the bolt rods retract at the rods, unlocking the door.

U.S. Pat. No. 2,238,379 discloses a lock for container lids having a rotatable disc with radially extending arms secured to the underside links are pivotally connected at their inner ends to the arms on the rotatable disc by the first ends of the links. A tension spring is connected between the extremity of one of the radial arms and a lug secured to the underside of the top. When the handle is released, the spring acts to rotate the locking mechanism from an unlocked position to a locked position.

The prior art also shows restricting axial movement of members pivotally attached to a rotating disk by utilizing a friction means.

U.S. Pat. No. 729,052 discloses a grain-car door having latching members with inner ends pivotally attached to a rotory metal disk or locking-head. The outer ends of latching members pass through diagonal perforations in the braces and cleats, in which they fit snugly, such that their inner ends will, when the locking head is rotated, be moved inward toward the center of the head, causing the rods comprising the members to frictionally bind in the diagonal perforations, thus rendering it necessary to forcibly operate the head against the action of this frictional engagement of the parts, whereby accidental releasing of the latches is entirely obviated.

These locking systems are fairly complex and expensive to manufacture. A locking system that restrains the disengagement of pivotally mounted members on a rotatable member through restricting angular movement of the pivotally mounted members is not disclosed. Thus, it would be desirable to have a system that restricts the opening or closing of a door using a device to restrict the angular movement of members pivotally mounted to a rotatable member.

SUMMARY OF THE INVENTION

It is therefore one object of the present invention to provide an improved latch system for securing a door in a closed position.

It is another object of the present invention to provide a latch system to secure a rotatable member and multiple elongate members pivotally connected to the rotatable member in an engaged position, securing the door in a closed position.

It is yet another object of the present invention to provide an improved latch system which secures the door in a closed position by preventing angular movement of one or more elongate members pivotally connected to a rotatable member in an engaged position.

The foregoing objects are achieved as is now described. In accordance with the apparatus of the present invention, a latch system is provided having utility in securing a door or planar member in a fixed position within a housing having a portal. The portal includes a defined periphery with a plurality of apertures therein. The planar member is pivotally mounted adjacent the portal. A rotatable member is mounted adjacent to the planar member, wherein the rotatable member may rotate in a plane parallel to the planar member. The latch system also includes a plurality of elongate members with each of the plurality of elongate members having a first end and a second end. Each first end is adapted to slidably enter an associated aperture and each second end is pivotally mounted to the rotatable member, wherein rotation of the rotatable member will cause both angular and axial movement of the elongate members. Rotation of the rotatable member in a first direction causes each first end of an elongate member to engage an associated aperture, and rotation in the opposite direction will cause each first end to disengage from the associated aperture. Thus, rotation of the rotatable member in the first direction will cause the planar member to be secured in a closed position in relation to a portal and rotation of the rotatable member in the opposite direction will permit the planar member to pivot, allowing the planar member to be placed in a open position in relation to the portal.

A plurality of guide members are provided for assisting and guiding movement of the plurality of elongate members into and out of the apertures. Each of the guide members are located adjacent to the planar member intermediate and associated aperture within the periphery of the portal and the rotatable member. Each guide member includes a guide aperture sized to slidably receive an associated elongate member.

In accordance with an important feature of the present invention, a latch means is provided intermediate the rotatable member and at least one associated guide member, wherein the latch means may be utilized to selectively restrict angular movement of at least one member of the plurality of elongate members.

The above as well as additional objects, features, and advantages of the invention will become apparent in the following detailed description.

BRIEF DESCRIPTION OF THE DRAWINGS

The novel features believed charactreristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
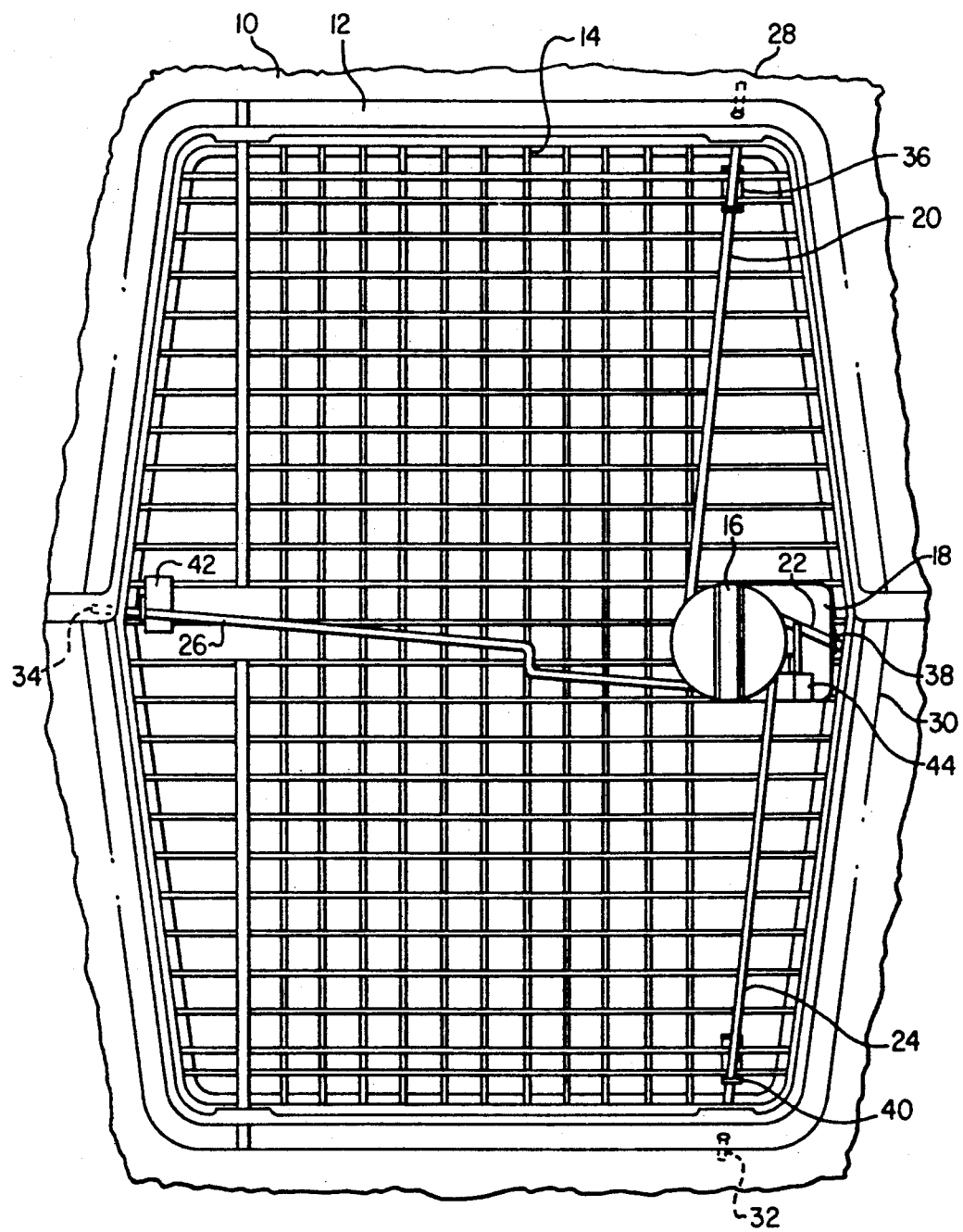
FIG. 1 depicts a front view of the latch system of the present invention mounted on a kennel door.

With reference now to the figures and in particular with reference to FIG. 1, there is depicted a front view of the latch system of the present invention comprising a housing 10 with a planar member 14 or a door pivotally mounted adjacent to a portal 12. In a preferred embodiment of the present invention, planar member 14 is a door comprising a metallic grid and the housing is a plastic kennel. Planar member 14 could also be made out of other materials. For example, a polymeric material could be used. Additionally, a mix of materials could be used. It will be appreciated by those skilled in the art that the latch system could be used in other housings besides a plastic kennel.

A rotatable member 16 is fixedly mounted adjacent to planar member 14 such that the rotatable member 16 rotates in a plane parallel to the planar member 14. In this embodiment, the rotatable member 16 is a circular disk mounted on a mounting base 18. The disk is of a size suitable for manipulation or rotation by a human hand, and a plastic handle is attached to the disk.

Elongate members 20, 22, 24, and 26 are used to secure planar member 14 in a fixed position relative to housing 10. The first end of each elongate member 20, 22, 24, and 26 is adapted to slidably enter associated apertures 28, 30, 32, and 34 formed in the periphery of portal 12. The second end of each elongate member 20, 22, 24, and 26 is pivotally mounted to rotatable member 16. Elongate members 20, 22, 24, and 26 in this preferred embodiment are in an unsecured position.

Rotation of rotatable member 16 causes angular and axial movement of elongate members 20, 22, 24, and 26. Rotation in a first direction causes each first end of an elongate member to engage associated apertures 28, 30, 32, and 34; rotation in the opposite causes each first end of elongate members 20, 22, 24, and 26 to disengage from associated apertures 20, 30, 32, and 34.

In addition, a plurality of guide members 36, 38, 40, and 42 are used to guide the movement of elongate members 20, 22, 24, and 26 into and out of apertures 28, 30, 32, and 34. Guide members 36, 38, 40, and 42 are located adjacent to planar member 14 intermediate to affiliated apertures 28, 30, 32, and 34 and rotatable member 46. Each guide member 28, 30, 32, and 34 has a guide aperture that is sized to slidably receive an affiliated elongate members 20, 22, 24, and 26.

A latch means 44, located intermediate rotatable member 16 and associated guide member 38, is used to restrict angular movement of elongate member 22.

Although FIG. 1 shows only one securing means 36, more than one securing means may be used to restrict angular movement of elongate members 20, 22, 24, and 26. Furthermore, in this preferred embodiment, securing means 36 is mounted on mounting base 18 intermediate rotatable member 16 and guide member 30.

Figure 2:
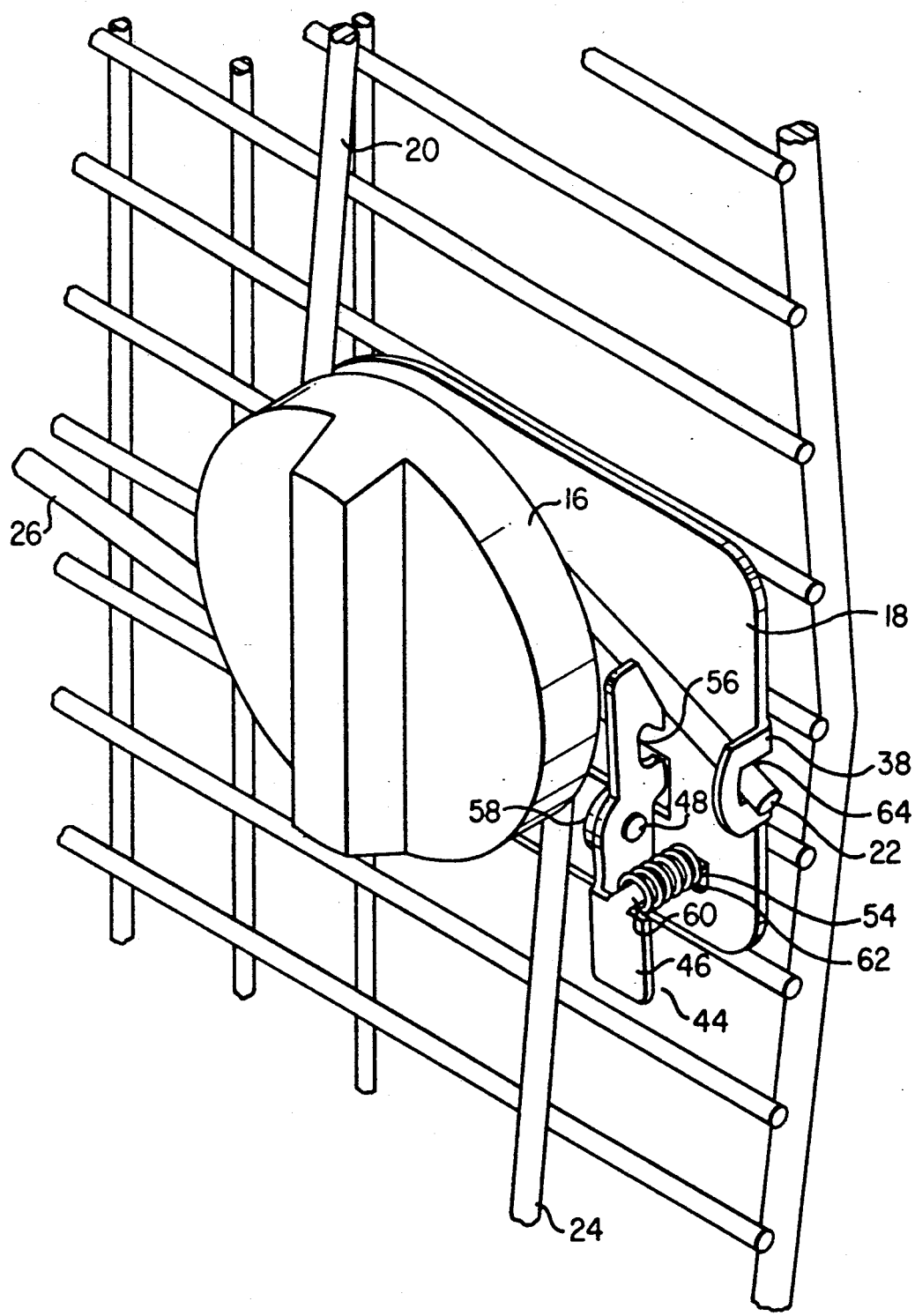
FIG. 2 is a perspective view of the latch system of the present invention mounted on a kennel door.

Referring to FIG. 2 there is depicted a perspective view of the invention of the latch system mounted to a kennel door. Rotatable member 16 and securing means 44 are mounted on mounting base 18. Mounting base 18 is mounted adjacent to planar member 14. Rotatable member 16 has elongate members 20, 22, 24, and 36 pivotally mounted to rotatable member 16.

Latch means 44 is located intermediate rotatable member 16 and guide member 38. Latch means 44 in this preferred embodiment comprises a flange 46, a rivet 48, a spring 54 and a groove 56. Flange 46 is mounted on a mounting member 58 extending from mounting base 18. Flange 46 is secured to mounting member 58 by rivet 48. In addition, flange 46 is biased towards mounting base 18 by spring 54 that is placed around biasing flange 60 extending from flange 46 through a hole 62 in mounting base 18. Hole 62 permits movement of biasing flange 60, but hole 62 is of a size that prevents spring 54 from sliding through it. Not shown is an end of biasing flange 60 adapted to prevent biasing flange 60 from disengaging from hole 62.

Groove 56 in flange 46 is adapted to receive elongate member 22 when elongate member 22 is in a secured position. In the secured position, groove 56 restricts angular movement of elongate member 22. In turn, movement of rotatable member 16 is also restricted, resulting in elongate members 20, 24, and 26, pivotally mounted the rotatable member 16, also being restricted from angular movement. Angular movement of elongate members 20, 22, 24, and 26 may be unrestricted by biasing flange 46 in a manner that moves groove 56 into a position away from elongate member 22, thus, allowing angular movement of elongate member 22.

Guide aperture 64 is shown sized to slidably accept elongate member 22. In this preferred embodiment guide member 38 associated with latch means 44 is incorporated into mounting base 18. The other mounting members do not necessarily need to be incorporated into a mounting base of any kind. Furthermore, mounting member 38 could be separate from mounting base 18.

Figure 3:
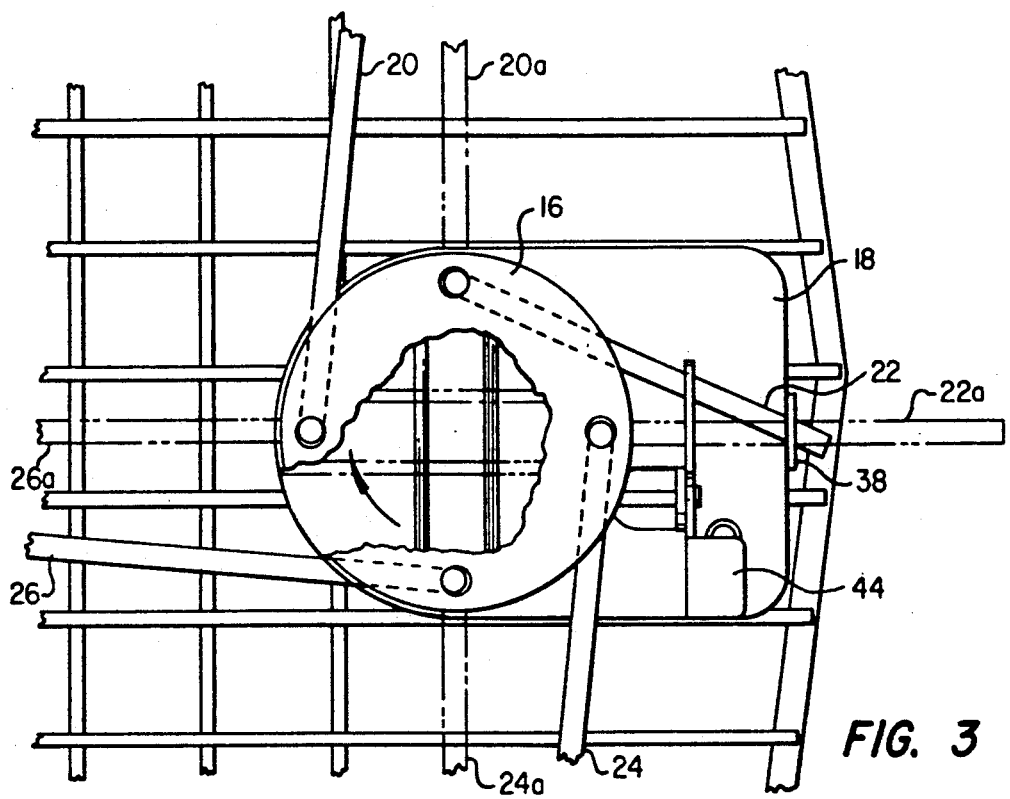
FIG. 3 depicts the latch system of the present invention in a secured and unsecured position.

FIG. 3 depicts the latch system of the present invention in a secured and unsecured position. Rotatable member 16 is fixedly mounted to mounting base 18. Elongate members 20, 22, 24, and 26 are pivotally attached at one end to rotatable member 16. The other end of elongate members 20, 22, 24, and 26 are adapted to slidably enter an associated aperture. Rotation of rotatable member 16 in a first direction causes the first ends of elongate members 20a, 22a, 24a, and 26a to engage an associated aperture, placing the latch system in an engaged or secured position. Rotating rotatable member 16 in an opposite causes the first ends of elongate members 20, 22, 24, and 26 to disengage from associated apertures, placing the latch system in a disengaged or unsecured position.

Latch means 44 is located intermediate rotatable member 16 and associated guiding member 32. In this preferred embodiment, latch means 44 is a grasping member located on mounting base 18 and being biased downward toward mounting base 18. When the elongate members move from an unsecured position to a secured position, latch means 44 restricts angular movement of elongate member 22.

Figure 4:
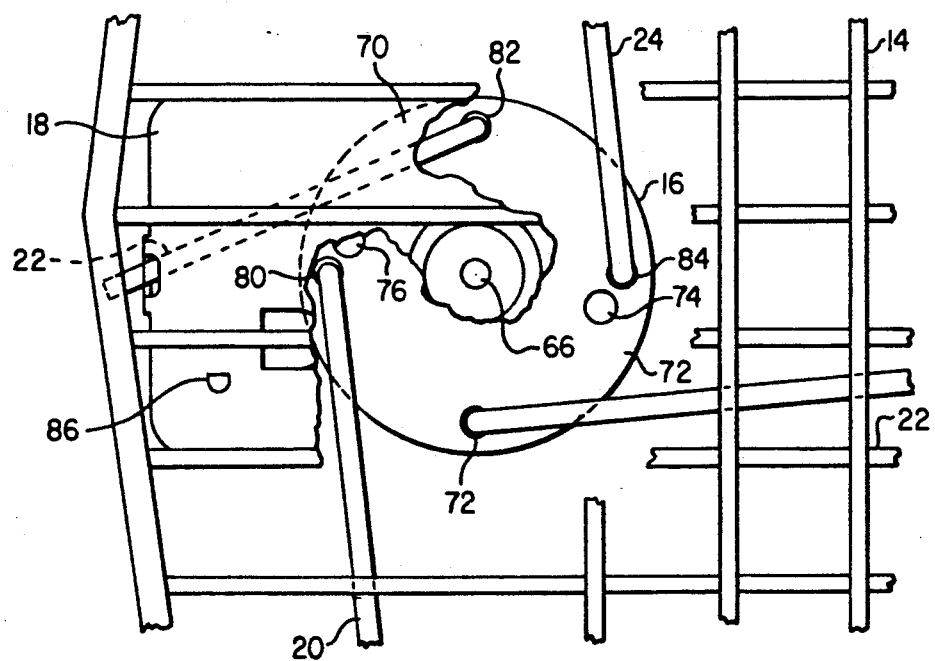
FIG. 4 is a rear view of the latch system of the present invention attached to a kennel door.

Referring to FIG. 4 there is depicted a rear view of the latch system of the present invention. Mounting base 18 is shown mounted adjacent to planar member 14. Rotatable member 16 is rotatably mounted to mounting base 18 with a rivet 66. Rotatable member 16 has a handle 70 and a base 72. Base 72 is attached to the handle by two rivets 74 and 76. Base 72 also contains four pivotal apertures 78, 80, 82, and 84. Elongate members 20, 22, 24, and 26 are pivotally mounted at one end to base 72 of rotatable member 16 in mounting apertures 78, 80, 82, and 84.

Also shown is biasing member 60 of the flange with an end 86 adapted to prevent if from exiting hole 62.

Although the preferred embodiment uses four elongate members, any number of elongate members may be used. Furthermore, elongate members may come in various shapes and lengths. For example, the elongate member may be a rod or a bar.

The rotatable member in the preferred embodiment is circular in shape, however, other shapes may also be used within the scope of the invention. In addition, the rotatable member may be shaped or have a handle attached to it suitable for manipulation by the human hand or by human digits. Moreover, the rotatable member could be mounted on the inside or outside of the planar member relative to the housing.

In the preferred embodiment, the latch means contains one grasping member. It is contemplated that other types of latch means may be used besides a grasping member.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A latch system having utility in securing a planar member in a fixed position comprising:
   a housing having a portal, said portal having a defined periphery with a plurality of apertures within said defined periphery, said planar member being pivotally mounted adjacent said portal;
   a rotatable member mounted adjacent to said planar member, wherein said rotatable member rotates in a plane parallel to said planar member;
   a plurality of elongate members, each of said plurality of elongate members having a first end and a second end, each first end being adapted to slidably enter an associated aperture and each second end being pivotally mounted to said rotatable member, wherein rotation of said rotatable member will cause angular and axial movement of each of said plurality of elongate members and wherein rotation of said rotatable member in a first direction will cause each first end to engage an associated aperture and rotation in a second direction will cause each first end to disengage from said associated aperture;
   a plurality of guide members for assisting in guiding movement of said plurality of elongate members into and out of said plurality of apertures, each of said plurality of guide members located adjacent to said planar member intermediate an associated aperture and said rotatable member and having a guiding aperture sized to slidably receive an associated elongate member; and
   latch means attached to said planar member and located intermediate said rotatable member and at least one associated guide member, said latch means comprising a flange having a beveled edge adapted to cooperate with an elongate member of said plurality of elongate members and a groove adjacent said beveled edge adapted to engage said elongate member, wherein rotation of said rotatable member in said first direction causes said elongate member to cooperate with said beveled edge to cause said groove to receive and secure said elongate member, whereby further angular movement of said elongate member is restricted.

2. The latch system of claim 1 wherein said housing is a kennel for housing at least one animal.

3. The latch system of claim 1 wherein said planar member comprises a grid.

4. The latch system of claim 1 wherein said planar member comprises a polymeric material.

5. The latch system of claim 1 wherein said planar member comprises a metallic material.

6. The latch system of claim 1 wherein said rotatable member is of a size suitable for rotation by a human hand.

7. The latch system of claim 1 wherein a handle suitable for manipulation by human digits is attached to said rotatable member.

8. The latch system of claim 1 wherein said latch means is a grasping member, wherein said grasping member engages an elongate member when a first end of said elongate member has engaged an aperture associated with said elongate member resulting in restriction of angular movement of said elongate member.

9. The locking system of claim 1 wherein said latch means further comprises:
   a base;
   said flange positioned over said base having an upper side and a bottom side, said bottom side facing said base, said beveled edge adapted to cooperate with said elongate member, and said groove adapted to engage said elongate member, said flange being positioned such that said beveled edge, normally being biased in a position towards said base, cooperates with said elongate member to bias said groove away from said base and allows said elongate member to move towards said groove until said groove receives said elongate member, whereby said groove becomes biased in a position towards said base and further angular movement of said associated elongate member is restricted until said groove is forcibly biased into a position away from said associated elongate member; and an attaching member connecting said flange to said base.

10. The latch system of claim 1 wherein said plurality of elongate members comprises four rods.

* * * * *